United States Patent
Rowley (10) Patent No.: US 8,606,832 B2
(45) Date of Patent: Dec. 10, 2013

(54) DYNAMIC MANAGEMENT OF GROUPS

(75) Inventor: Peter Andrew Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 222 days.

(21) Appl. No.: 11/588,094

(22) Filed: Oct. 24, 2006

(65) Prior Publication Data

US 2008/0098009 A1      Apr. 24, 2008

(51) Int. Cl.
*G06F 12/00* (2006.01)
*G06F 17/00* (2006.01)

(52) U.S. Cl.
USPC .......................................... 707/822; 707/828

(58) Field of Classification Search
None
See application file for complete search history.

(56) References Cited

U.S. PATENT DOCUMENTS

| | | | |
|---|---|---|---|
| 6,366,954 B1 * | 4/2002 | Traversat et al. | 709/220 |
| 6,671,695 B2 * | 12/2003 | McFadden | 707/656 |
| 6,768,988 B2 | 7/2004 | Boreham et al. | |
| 6,785,686 B2 | 8/2004 | Boreham et al. | |
| 7,016,893 B2 | 3/2006 | Boreham et al. | |
| 7,016,907 B2 | 3/2006 | Boreham et al. | |
| 7,020,662 B2 | 3/2006 | Boreham et al. | |
| 7,130,839 B2 | 10/2006 | Boreham et al. | |
| 7,363,339 B2 * | 4/2008 | Delany et al. | 709/202 |
| 7,370,045 B2 * | 5/2008 | Vora et al. | 707/6 |
| 2004/0103102 A1 * | 5/2004 | Nelson | 707/100 |
| 2004/0215735 A1 * | 10/2004 | Nakahara et al. | 709/207 |
| 2006/0074621 A1 * | 4/2006 | Rachman | 703/22 |

OTHER PUBLICATIONS webopedia.com, folder, Jun. 21, 2002, http://www.webopedia.com/TERM/f/folder.html.*
webopedia.com, directory, Mar. 04, 2004, http://www.webopedia.com/TERM/D/directory.html.*
S. Haripriya et al., LDAP: Dynamic Groups for LDAPv3 draft-haripriya-dynamicgroups-02, Internet-Draft, Jan. 5, 2007, pp. 1-22, Novell, Inc.

* cited by examiner

*Primary Examiner* — Usmaan Saeed
*Assistant Examiner* — Yu Zhao
(74) *Attorney, Agent, or Firm* — Lowenstein Sandler LLP (57) ABSTRACT

A method and apparatus for managing groups in a directory server is described. In one embodiment, an addition of an identifier of a group to an entry in the directory server is received. A value of an attribute in the entry is updated with the identifier of the group. A content of the group is dynamically changed based on the addition of the identifier of the group to the entry in the directory server.

3 Claims, 8 Drawing Sheets

LDIF fragment to create group branch under root

502 — dn: ou=groups,dc=example,dc=com
objectclass:organizationalunit
ou: groups
description: groups branch create the hrpeople entry dn: cn=hrpeople,dc=groups,dc=example,dc=com
objectclass: groupofnames
cn: hrpeople
description: HR group
504 — # add the group members all of which are
assumed to exist under people
member: cn=john doe,ou=people,dc=example,dc=com
member: cn=jane doe,ou=people,dc=example,dc=com
...

MANUAL ENTRY
OF EACH MEMBER

DYNAMIC MANAGEMENT OF GROUPS

TECHNICAL FIELD

Embodiments of the present invention relate to a Lightweight Directory Access Protocol (LDAP), and more specifically to dynamic management of groups.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

Entries may be part of a group, for example, a static group. The static group is one which where membership is specified by presence in a list. Thus, a static group may comprises a list of members. The specific members are listed and identified by their attribute. Membership may change at any time, just as one might cross a name off the paper list or write in a new name. Such a potentially large static group may be either prone to error or not always up to date.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for managing groups in a directory server is described. An addition of an identifier of a group to an entry in a directory server is received. A value of an attribute in the entry is updated with the identifier of the group. A content of the group is dynamically changed based on the addition of the identifier of the group to the entry in the directory server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing information in a form readable by a machine (e.g., a computer). For example, a machine-accessible storage medium includes read only memory ("ROM"); random access memory ("RAM"); magnetic disk storage media; optical storage media; flash memory devices; etc.

Figure 1:
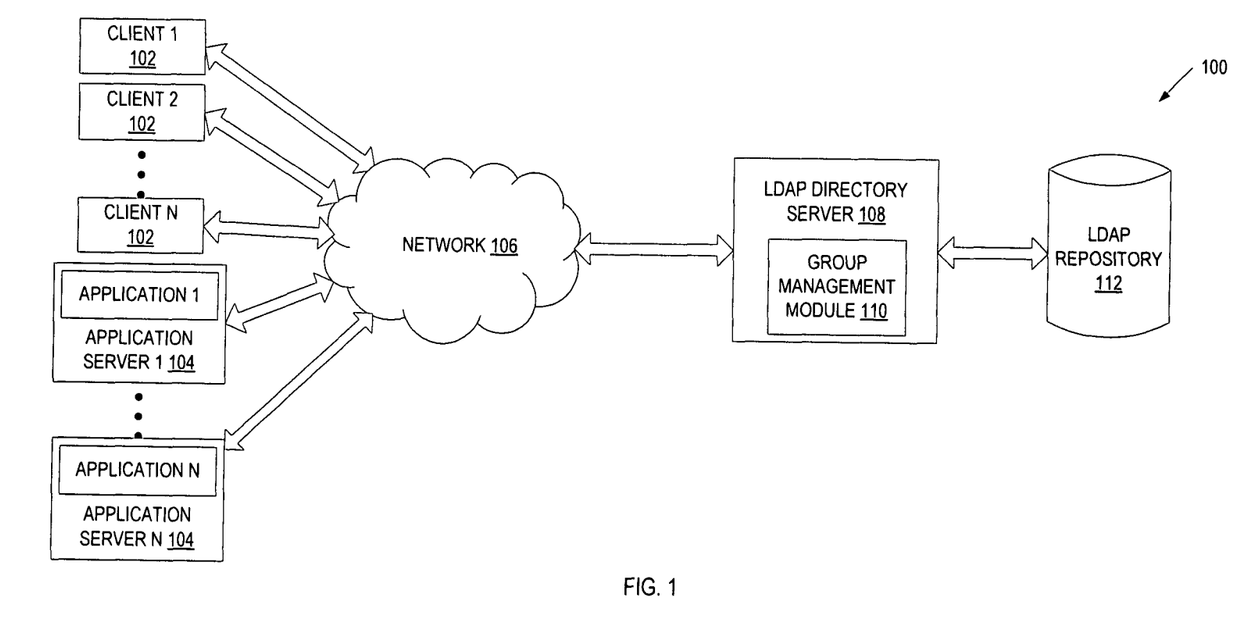
FIG. 1 illustrates a network architecture in which embodiments of the present invention may be implemented.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). Server 108 may be a single server or a cluster of servers. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP directory server 108 includes a group management module 110 that may be part of the LDAP directory server 108 or some other device and/or program, or be an independent module implemented in hardware, software or a combination thereof.

In one embodiment, the group management module 110 manages groups formed in the LDAP directory server 108. Groups are typically defined based on certain common characteristics of members of the groups. A member can be included in a group if the member has an attribute of a specific type. Groups can be static or dynamic.

A static group is one where membership is specified by presence in a list. For example, a static group may comprise a list of members. The specific members are listed and identified by their attribute. Membership may change at any time, just as one might cross a name off the paper list or write in a new name. The operation and management of a static group is further described in FIG. 4.

A dynamic group is one where membership is inherent in some property of the entries. For example, a group containing a number of persons in an organization may be "everyone who works in the HR department". This would be defined by a filter (query) against the directory for "department=HR". As people are hired, laid-off, or transferred in the company, they may become part of the HR department group. One key feature of dynamic groups is that they require less explicit maintenance. On the other hand, a static group that is intended to contain everyone in the HR department would need to be maintained, either manually or by a script. Such a potentially large static group may be either prone to error or not always up to date. There are also implementation efficiency issues relating to static versus dynamic groups. Thus, in a dynamic group, instead of looking at a group attribute to verify if a user possesses the group attribute, membership is determined by checking a user attribute, which can be specified arbitrarily.

In accordance with one embodiment, the group management module 110 receives an addition of an identifier of a group to an entry in the LDAP directory server 108. The group management module 110 updates the value of an attribute in the entry with the identifier of the group. The group management module 110 then dynamically changes a content of the group based on the addition of the identifier of the group to the entry in the LDAP directory server 108.

Figure 2:
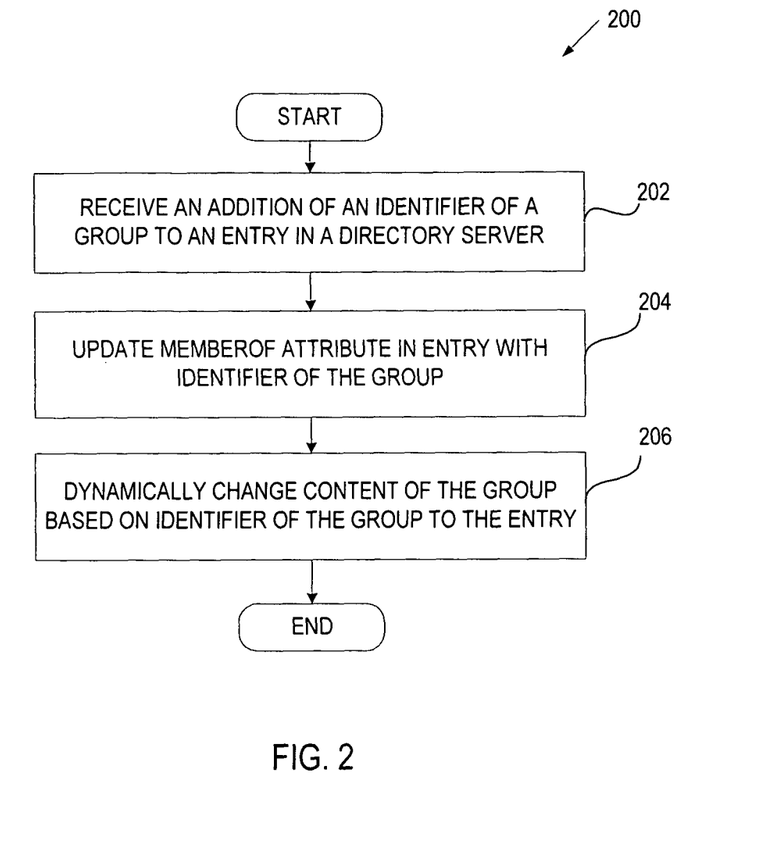
FIG. 2 illustrates a flow diagram of one embodiment of a method for managing groups in a directory server.

FIG. 2 illustrates a flow diagram of one embodiment of a method 200 for managing groups in a LDAP directory server. The method may be performed by processing logic that may comprise hardware (e.g., circuitry, dedicated logic, programmable logic, microcode, etc.), software (such as instructions run on a processing device), or a combination thereof. In one embodiment, method 200 is performed by the group management module 110 of the LDAP directory server 108 of FIG. 1.

Referring to FIG. 2, at block 202, a processing logic of the LDAP directory server 108 receives an addition of an identifier of a group to an entry in the LDAP repository 112. For example, the identifier may arbitrarily identify a group such as the HR group, or the IT group. In accordance with one embodiment, the group may comprise a static group. In accordance with another embodiment, the group may comprise a dynamic group. The entry, for example, may have a unique identifier such as its Distinguished Name (DN).

At block 204, processing logic updates a value of an attribute in the entry with the identifier of the static group. In accordance with one embodiment, the attribute may comprise a "memberof" attribute. For example, an entry of an employee of a company working in the HR department may have an attribute of "memberof=HRpeople".

At block 206, processing logic dynamically changes the content of the group based on the addition of the identifier of the group to the entry in the LDAP directory server 108. In accordance with one embodiment, the content of the group may comprise a membership. The content of the group may be dynamically changed by first determining that the value of the attribute of the entry corresponds to the group and second adding an identifier (e.g., a DN) of the entry to the content of the group. For example, an entry for an employee of a company may include the following attribute: "memberof= HRpeople". The processing logic determines whether the value of the attribute ("HRpeople") corresponds to a group. Assuming the group called "HRpeople" already exists in the LDAP directory server 108, the employee with the above attribute is thus added as a member of the "HRpeople" group in the LDAP directory server. Thus the content of the "HRpeople" group may be dynamically changed and updated based on the attributes of the entries of the employees of the company. Furthermore, the content of the group may be dynamically changed such that the entry does not have to be manually added to the group.

Figure 3:
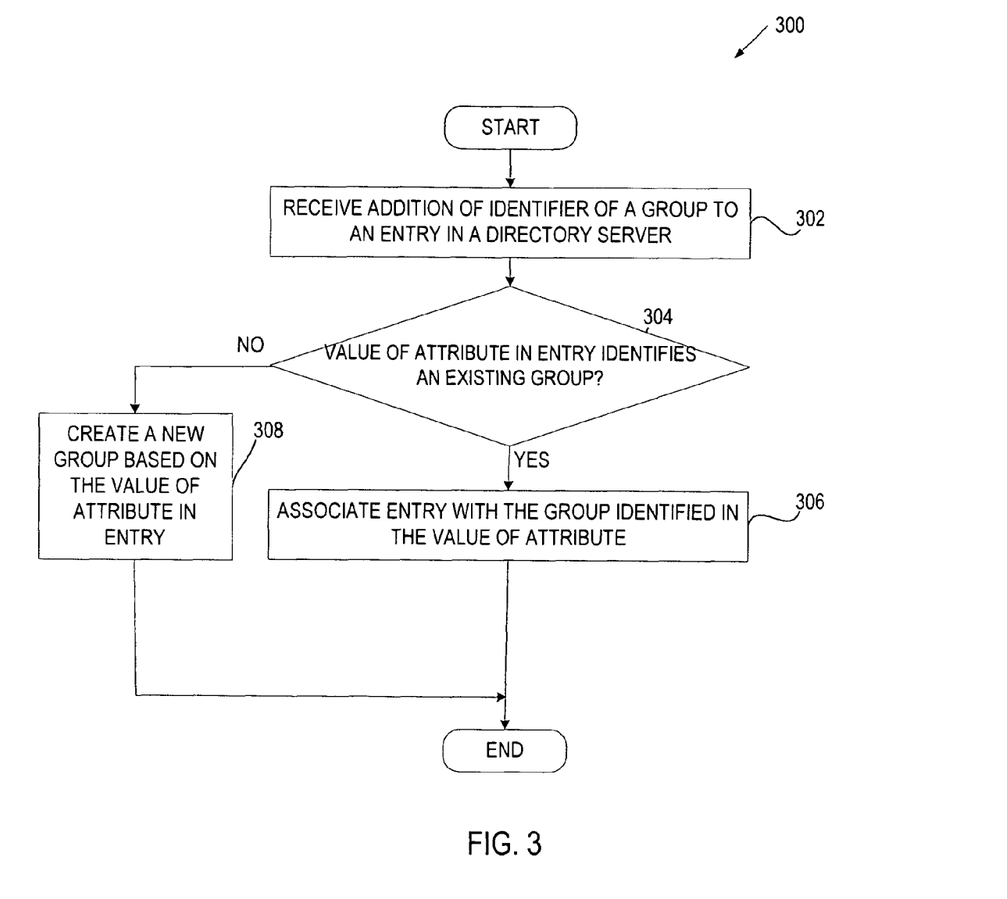
FIG. 3 illustrates a flow diagram of another embodiment of a method for managing groups in a directory server.

FIG. 3 illustrates a flow diagram of an alternative embodiment of a method for managing groups in an LDAP directory server. The method may be performed by processing logic that may comprise hardware (e.g., circuitry, dedicated logic, programmable logic, microcode, etc.), software (such as instructions run on a processing device), or a combination thereof. In one embodiment, the method is performed by the LDAP directory server 108 of FIG. 1.

Referring to FIG. 3, at block 302, a processing logic of the LDAP directory server 108 receives an addition of an identifier of a group to an entry in the LDAP repository 112. For example, the identifier may arbitrarily identify a group such as the HR group, or the IT group. In accordance with one embodiment, the group may comprise a static group. In accordance with another embodiment, the group may comprise a dynamic group. The entry, for example, may have a unique identifier such as its Distinguished Name (DN).

At block 304, processing logic determines whether the value of an attribute of the entry identifies an existing group in the LDAP repository 112. Following the above example described with respect to FIG. 2, processing logic determines whether the value of the attribute ("HRpeople") corresponds to an existing group in the LDAP directory repository 112.

At block 306, if the value of the attribute of the entry identifies an existing group in the LDAP repository 112, the identifier of the entry is added to the content of the group. For example, a DN of the employee working in the HR department may be added to the HRpeople group in the LDAP repository 112.

At block 308, if the value of the attribute of the entry does not correspond or identify an existing group in the LDAP repository 112, a new group based on the value of the attribute is created in the LDAP repository 112. The identifier of the entry is added to the content of the newly created group. For example, a DN of an employee working in a newly created Legal department may be added to a newly created "Legalpeople" group in the LDAP repository 112. Thus, a new group can be created if it does not already exist in the LDAP repository 112. The new group may be based on the value of the attribute of the entry. The action performed in block 306 may thus include creating a new group in the LDAP repository 112.

In accordance with another embodiment, if the value of the attribute of an entry no longer corresponds to a group in the LDAP repository 112, the identifier of the entry may be deleted from the content of the group. In one embodiment, if the group has no other members, the entire group is deleted. For example, if an entry of an employee previously has "memberof=HRpeople", and now has "memberof=Legalpeople", the employee would be removed from the HRpeople group. If the Hrpeople group has no other members, the Hrpeople group is deleted. As described in FIG. 3, the content of the group may be dynamically changed such that the entry does not have to be manually added to the group.

Figure 4:
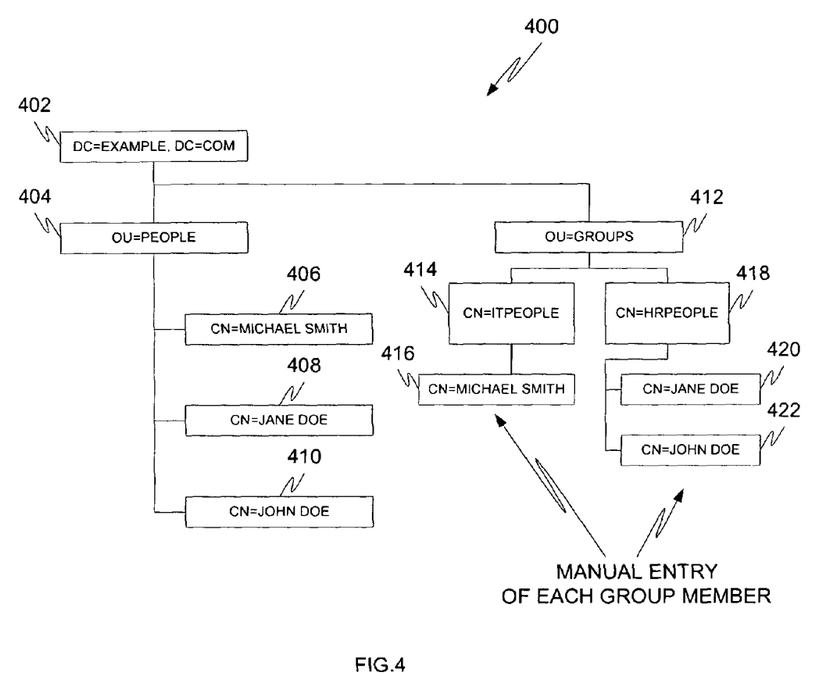
FIG. 4 illustrates a block diagram of a group of a conventional directory server.

FIG. 4 illustrates a block diagram of a conventional group management of an LDAP directory server. The distributed directory tree 400 includes a root entry 402 where a company named "Example.com" has a root entry of "dc=example, dc=com". The root entry 402 has a first node 404, and a second node 412. The first node 402 and second node 402 include entries for the organization unit (ou). For example, the first node 402 defines an organization unit subtree for employees in the company (ou=people). Entries 406, 408, 410 corresponds to the individual employees working in the company. Each entry includes a Relative Distinguished Name (RDN) such as cn=michael smith in entry 406. The second node 412 defines an organization unit subtree for groups in the company (ou=groups).

The groups may be composed of IT group 414 and HR group 418. The content of each group can be populated and maintained by manually entering the group members for the respective group. The content of each group includes members that are assumed to exist in the company (under "ou=people" branch 404). For example, the IT group 414 may comprise employee Michael Smith 416. The HR group 418 may comprise employees Jane Doe 420, and John Doe 422. The content of the group are manually entered and thus manually updated.

Figure 5:
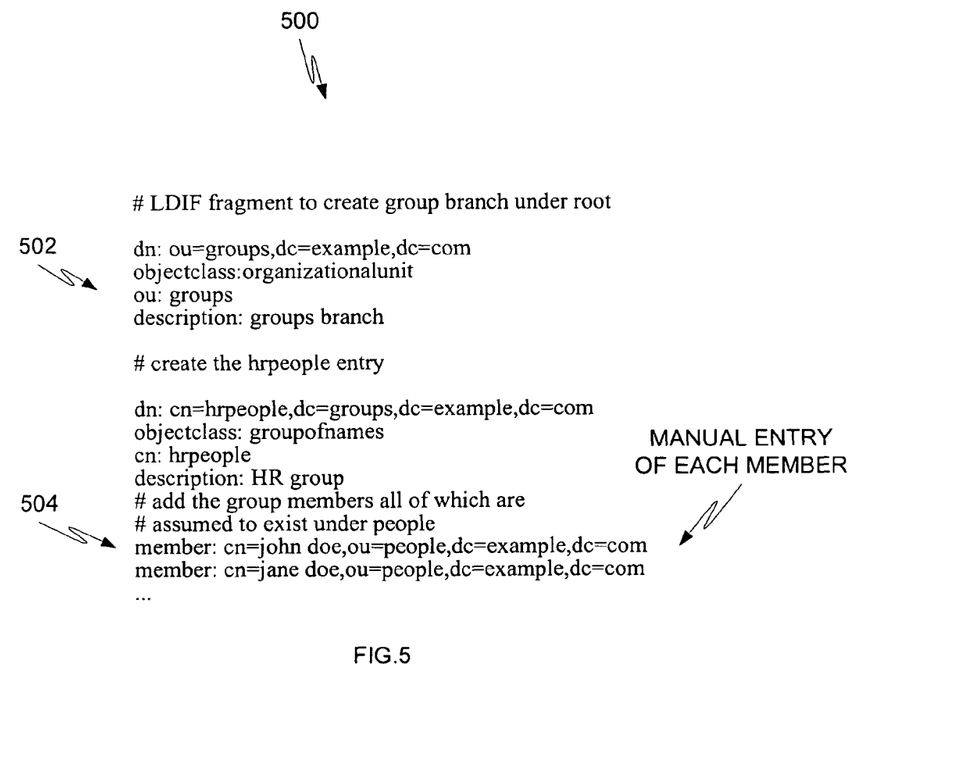
FIG. 5 illustrates an example of an entry of the group of FIG. 4.

FIG. 5 illustrates an example of an LDIF fragment 500 that shows building a group called "hrpeople" who could be given privileges to access confidential employee documents such as employment agreements, salary, etc. The individual group member entries 504 are manually entered and are assumed to already exist in the directory under "ou=people" branch. This configuration creates a separate branch called "groups" 502 under which is placed the "hrpeople" group. FIG. 5 is based on the graphical illustration of the organization "example.com" previously illustrated in FIG. 4.

Figure 6:
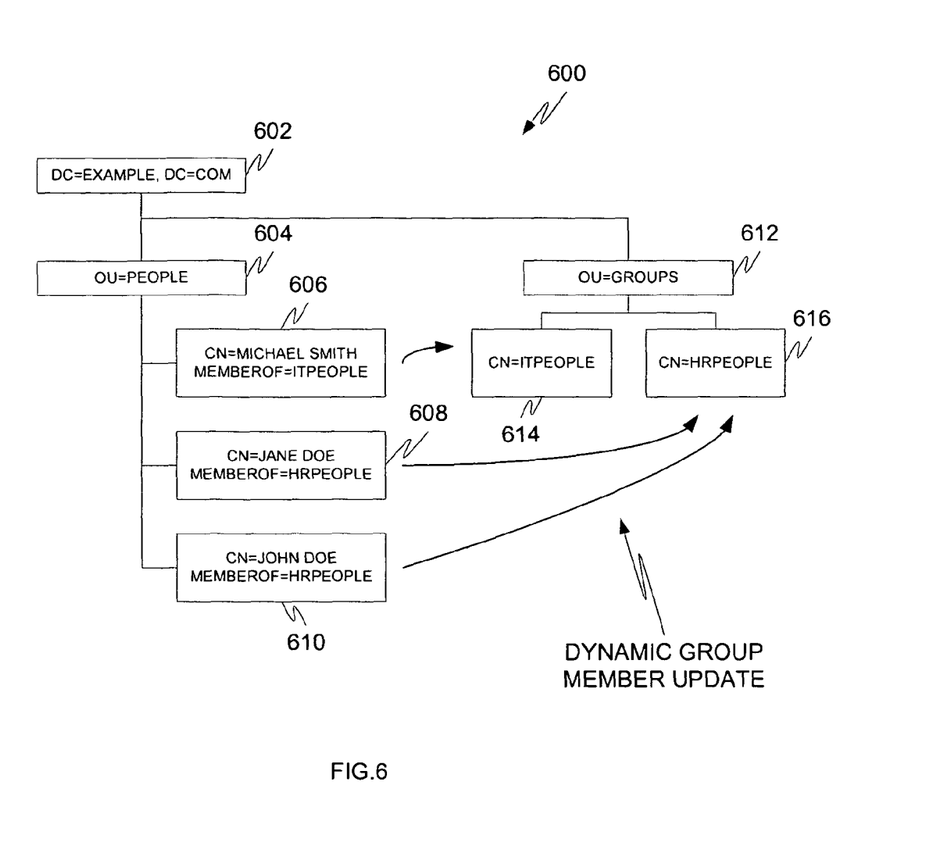
FIG. 6 illustrates a block diagram of a group of a directory server in accordance with one embodiment.

FIG. 6 illustrates a block diagram of one embodiment of a group management of an LDAP directory server. The distributed directory tree 600 includes a root entry 602 where a company named "Example.com" has a root entry of "dc=example, dc=com". The root entry 602 has a first node 604, and a second node 612. The first node 604 and second node 612 include entries for the organization unit (ou). For example, the first node 604 defines an organization unit subtree for employees in the company (ou=people). Entries 606, 608, 610 correspond to the individual employees working in the company "example.com". Each entry includes a Relative Distinguished Name (RDN) and another attribute. The other attribute may be a membership attribute that qualifies the entry as a member of a particular group. The group attribute may for example be "memberof". For example, entry 606 may include "cn=michael smith" and "memberof=itpeople". This means that "michael smith" is an individual employee of the organization "example.com" and is also part of an IT group of the organization "example.com".

Similarly, entry 608 may include "cn=jane doe" and "memberof=hrpeople". This means that "jane doe" is an individual employee of the organization "example.com" and is also part of an HR group of the organization "example.com".

Similarly, entry 610 may include "cnjohn doe" and "memberof=hrpeople". This means that "john doe" is an individual employee of the organization "example.com" and is also part of the HR group of the organization "example.com".

The second node 412 defines an organization unit subtree for groups in the company (ou=groups). The groups may comprise IT group 614 and HR group 616. The content of each group is dynamically populated and maintained based on the value of the "memberof" attribute in the employee entries 606, 608, 610. The content of each group includes members that are based on the value of the "memberof" attribute in the employee entries 606, 608, 610. For example, a query for the content of the IT group 616 may return employee Michael Smith 606. A query for the content of the HR group 616 may return employees Jane Doe 608, and John Doe 610. Thus, the content of the groups is dynamically changed based on the value of the "memberof" attribute in the entries under "ou=people" 604.

Figure 7:
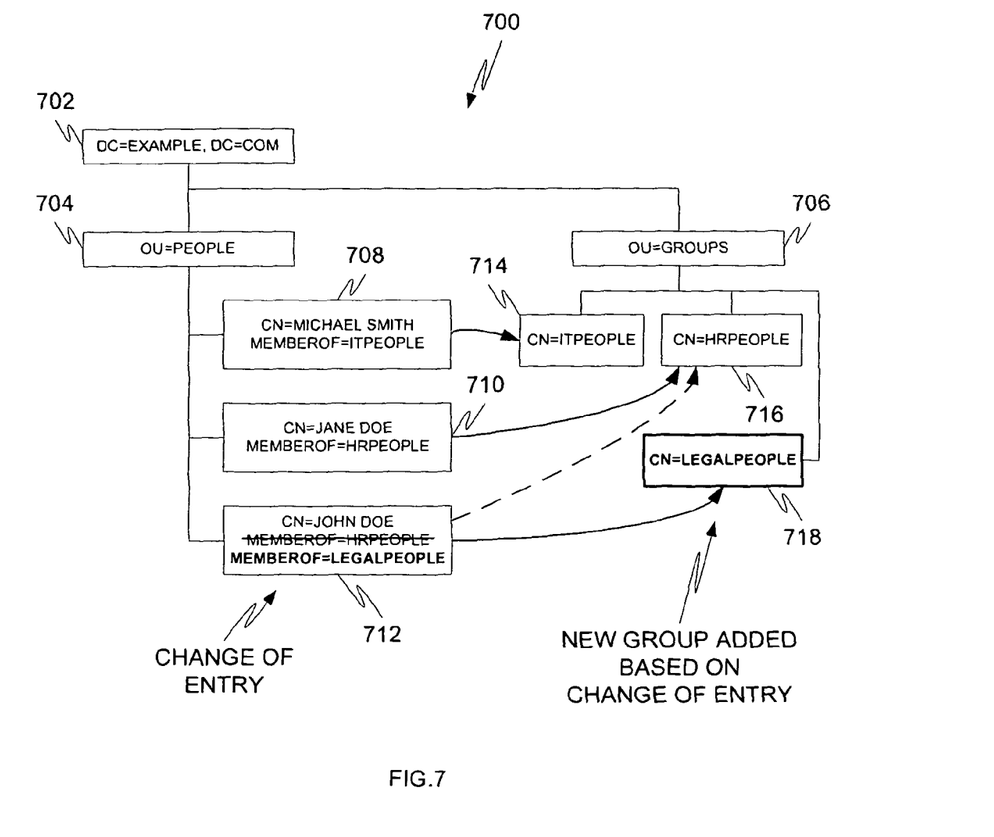
FIG. 7 illustrates a block diagram of a group of a directory server in accordance with another embodiment.

FIG. 7 illustrates a block diagram of another embodiment of a group management of an LDAP directory server. The distributed directory tree 700 includes a root entry 702 where a company named "Example.com" has a root entry of "dc=example, dc=com". The root entry 702 has a first node 704, and a second node 706. The first node 704 and second node 706 include entries for organization units (ou). For example, the first node 704 defines an organization unit subtree for employees in the company (ou=people). Entries 708, 710, and 712 correspond to individual employees working in the company "example.com". Each entry includes a Relative Distinguished Name (RDN) and another attribute. The other attribute may be a membership attribute that qualifies the entry as a member of a particular group. The group attribute may for example be "memberof". For example, entry 708 may include "cn=michael smith" and "memberof=itpeople". This means that "michael smith" is an individual employee of the organization "example.com" and is also part of an IT group of the organization "example.com".

Similarly, entry 710 may include "cnjane doe" and "memberof=hrpeople". This means that "jane doe" is an individual employee of the organization "example.com" and is also part of an HR group of the organization "example.com".

However, the value of the "memberof" attribute of the entry 712 for "cn john doe" may be changed from "memberof=hrpeople" to "memberof=legalpeople". This means that "john doe" is an individual employee of the organization "example.com" and is no longer part of the HR group of the organization "example.com" but is now part of a Legal group of the organization "example.com".

The second node 706 defines an organization unit subtree for groups in the company (ou=groups). The groups may be based on the value of the attribute "memberof" in the entries under "ou=people" 704. The content of IT group 714 and HR group 716 is dynamically populated and maintained based on the value of the "memberof" attribute in the employee entries 606, 608, 610. Entry 708 populates the content of group 714. Entry 710 populates the content of group 716. Because the value of the attribute "memberof" in entry 712 corresponds to a non-existing group under "ou=groups" 706, a new group is automatically created under "ou=groups" 706 having an identifier or a common name based on the new value of the attribute "memberof" of entry 712. In the example of FIG. 7, a "legalpeople" group did not exist and thus a new Legal group 718 having "cn=legalpeople" is created. In accordance with one embodiment, when a new group is created, the new group is a static group.

In accordance with one embodiment, groups under "ou=groups" 706 may include a static group and/or a dynamic group. For a static group, once the "memberof" attribute of an entry is updated, the static group's membership is automatically (and explicitly) modified to include a new member or delete an old member. For a dynamic group, a filter is modified or edited to retrieve all entries with the "memberof" attribute equal to the ID of the dynamic group. Subsequently, when a request for a list of members of the dynamic group is received, the filter is used to generate a list of members of this dynamic group.

Figure 8:
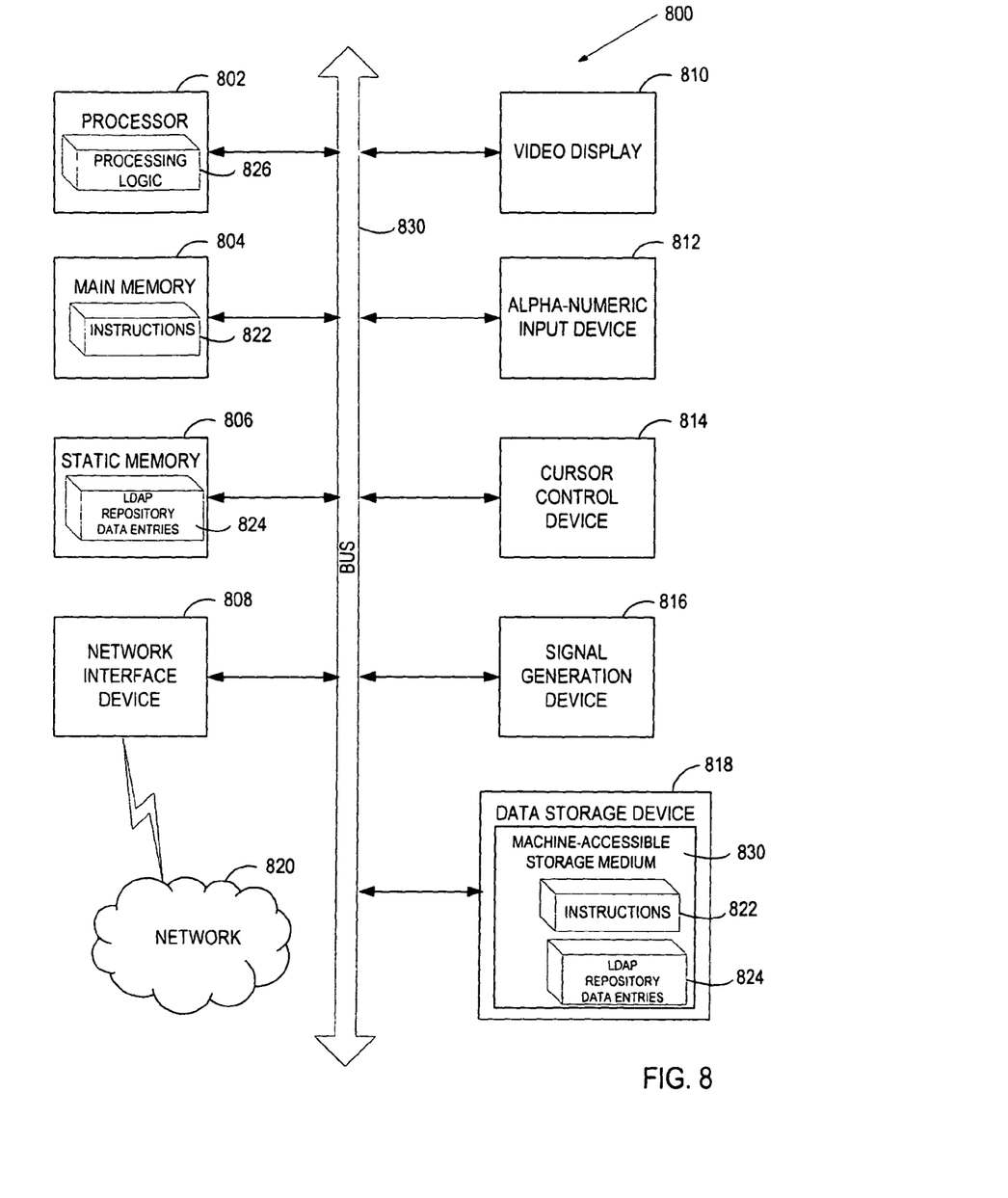
FIG. 8 illustrates a block diagram of an exemplary computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 830 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-accessible storage media. The software 822 may further be transmitted or received over a network 820 via the network interface device 808.

The machine-accessible storage medium 830 may also be used to store LDAP repository data entries 824. LDAP repository data entries 824 may also be stored in other sections of computer system 800, such as static memory 806.

While the machine-accessible storage medium 830 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for dynamically managing groups have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
configuring a Lightweight Directory Access Protocol (LDAP) directory comprising a first LDAP node and a second LDAP node, the first LDAP node comprising one or more group entries each representing a group, wherein the group is a static group, and the second LDAP node comprising one or more individual data entries in a directory, each of the individual data entries in the second LDAP node being associated with one or more group entries of the first LDAP node via a membership attribute;
receiving an identifier of groups;
receiving a change request to change a first value of the membership attribute of a particular individual data entry in the second LDAP node to a second value, wherein the first value and the second value are identifiers of the groups;
determining whether the first LDAP node contains a group entry in the one or more group entries that matches the second value of the membership attribute for the particular individual data entry;
associating the particular individual data entry with the group entry that matches the second value based on a determination that the first LDAP node contains a matching group entry;
creating a new group entry in the first LDAP node using the second value of the membership attribute from the change request based on a determination that the first LDAP node does not contain a matching group entry;
changing content of the new group in view of the identifier of the group, wherein the second value of the membership attribute designated for indicating LDAP group membership of the particular individual data entry is an identifier of the new group entry;
determining, by a processing device, whether the one or more group entries is not associated with any of the one or more individual data entries via the membership attribute; and
deleting the one or more group entries that are not associated with any of the one or more individual data entries via the membership attribute.

2. An apparatus comprising:
a memory;
a processing device coupled to the memory;
a storage device to store a Lightweight Directory Access Protocol (LDAP) directory, the LDAP directory comprising a first LDAP node and a second LDAP node, the first LDAP node comprising one or more group entries each representing a group, wherein the group is a static group, and the second LDAP node comprising one or more individual data entries in a directory, each of the individual data entries in the second LDAP node being associated with one or more group entries of the first LDAP node via a membership attribute; and
a group management module coupled to the storage device and executed from the memory by the processing device to:
receive an identifier of groups,
receive a change request to change a first value of the membership attribute of a particular individual data entry in the second LDAP node to a second value, wherein the first value and the second value are identifiers of the groups,
determine whether the first LDAP node contains a group entry in the one or more group entries that matches the second value of the membership attribute for the particular individual data entry,
associate the particular individual data entry with the group entry that matches the second value based on a determination that the first LDAP node contains a matching group entry;
create a new group entry in the first LDAP node using the second value of the membership attribute from the change request based on a determination that the first LDAP node does not contain a matching group entry;
change content of the new group in view of the identifier of the group, wherein the second value of the membership attribute designated for indicating LDAP group membership of the particular individual data entry is an identifier of the new group entry;
determine whether the one or more group entries is not associated with any of the one or more individual data entries via the membership attribute; and
delete the one or more group entries that are not associated with any of the one or more individual data entries via the membership attribute.

3. A non-transitory machine-accessible storage medium including data that, when accessed by a processing device, cause the computer to execute operations comprising:
configuring a Lightweight Directory Access Protocol (LDAP) directory comprising a first LDAP node and a second LDAP node, the first LDAP node comprising one or more group entries each representing a group, wherein the group is a static group, and the second LDAP node comprising one or more individual data entries in a directory, each of the individual data entries in the second LDAP node being associated with one or more group entries of the first LDAP node via a membership attribute;
receiving an identifier of the group;
receiving a change request to change a first value of the membership attribute of a particular individual data entry in the second LDAP node to a second value, wherein the first value and the second value are identifiers of the groups;

determining whether the first LDAP node contains a group entry in the one or more group entries that matches;

associating the particular individual data entry with the group entry that matches the second value based on a determination that the first LDAP node contains a matching group entry;

creating a new group entry in the first LDAP node using the second value of the membership attribute from the change request based on a determination that the first LDAP node does not contain a matching group entry;

changing content of the new group in view of the identifier of the group, wherein the second value of the membership attribute designated for indicating LDAP group membership of the particular individual data entry is an identifier of the new group entry;

determining, by a processing device, whether the one or more group entries is not associated with any of the one or more individual data entries via the membership attribute; and deleting the one or more group entries that are not associated with any of the one or more individual data entries via the membership attribute.

* * * * *